United States Patent [19]

Tinder

[11] Patent Number: 4,883,974

[45] Date of Patent: Nov. 28, 1989

[54] VEHICULAR DOOR MULTIPLEXING SYSTEM

[75] Inventor: David V. Tinder, Dearborn, Mich.

[73] Assignee: United Technologies Automotive, Inc., Dearborn, Mich.

[21] Appl. No.: 191,097

[22] Filed: May 6, 1988

[51] Int. Cl.$^4$ ............................................. H02J 1/00
[52] U.S. Cl. ..................................... 307/10.1; 307/38
[58] Field of Search .................... 307/10 R, 38, 10.1; 318/49, 54–58, 112, 293, 280, 283

[56] References Cited

U.S. PATENT DOCUMENTS

| | | | |
|---|---|---|---|
| 4,289,997 | 9/1981 | Jung et al. | 318/49 X |
| 4,638,222 | 1/1987 | Sawaki | 318/112 X |
| 4,639,609 | 1/1987 | Floyd et al. | 307/10 R |
| 4,684,818 | 8/1987 | Carlson | 307/10 R |
| 4,694,238 | 9/1987 | Norton | 322/90 X |
| 4,774,441 | 9/1988 | Toyomasu et al. | 318/54 X |

Primary Examiner—William M. Shoop, Jr.
Assistant Examiner—Sharon D. Logan

[57] ABSTRACT

An automotive vehicle having a number of electrical components, particularly in the driver's door, with the electrical components powered by the main DC power contained in the main body of the vehicle. A number of relatively low power DC components and relatively high power DC components are in the door, with a main multiplexing unit located in the main vehicle body and a remote multiplexing unit electrically connected to the main multiplexing unit but located in the door, the two multiplexing units being electrically connected together by wiring extending across the hinge gap. A low power control unit is also located in the door controlled by the remote multiplexing unit, the DC power to the low power unit being directly supplied through it through wiring totally contained in the door, while the DC power to the high power unit is directly supplied from the main multiplexing unit in the vehicle body through the wiring extending across the hinge gap. Additionally at least two reversible DC motors are in the door, with a maximum of three electrical wires connected to the motors, a common wire connected across one side of each of the motors, and two separate, isolated wires connected to the other sides of the motors, all three wires being connected to one of the multiplexing units, DC power being supplied independently to the DC motors. A number of logic rules are programmed into the system to establish a series of precedent actions.

2 Claims, 2 Drawing Sheets

VEHICULAR DOOR MULTIPLEXING SYSTEM

TECHNICAL FIELD

The present invention relates to automotive multiplexing systems for controlling and/or powering various electrical components included in an automotive door including, for example, powered door locks, power windows, powered side rear-view mirrors, door curb locks, lighted key door locks, door curb lights, audio speakers, seat positioning controls, etc. The present invention further relates to such a system which includes a remote multiplexing unit within at least the front door on the driver's side of the vehicle.

BACKGROUND ART

As the number of electrical components in the doors of the vehicle have increased, the number of wires for transmitting the electrical system have likewise increased. This has resulted in a relatively large bundle of individual wires, particularly for the front doors and even more particularly for the driver's door, each of which wires needed to be interconnected between the doors and the main body of the motor vehicle. Additionally, it has added to the number of wires that must be run in the door itself and appropriately interconnected.

Such systems for the front door on the driver's side having a substantial number of electrical components including, for example, powered door locks, power windows, powered side rear-view mirrors, lighted key door locks, door curb lights, audio speakers, seat positioning controls, etc. have involved, for example, twenty-four or fifty-three or perhaps even in excess of eighty or more separate wires in non-multiplexed systems. This relatively large number of wires were bundled together to form a relative large diameter bundle which was snaked from an opening in the "A" pillar of the vehicle body into the proximal edge of the door frame.

Such wiring bundles have been relatively difficult to handle, relatively expensive and required special routing in order to avoid over-stressing or undue flexing of the wire bundle, which could damage and break one or more of the individual wires within the bundle, particularly those in the outer areas of the bundle.

For a separate, wiring solution to this problem, reference is had to assignee's co-pending U.S. patent application Ser. No. 07/191,089, of J. Wright, filed on even date herewith, entitled "Electrical Planar Cable Interconnection Between Automotive Door and Body", the disclosure of which is incorporated herein by reference.

Additionally, the wiring aspects and electronic module aspects of the present invention lend themselves well for use in association with modular door panel sub-assemblies. With respect to such a sub-assembly approach and for further information on exemplary modular door panel sub-assembly operations and structures, reference is had to assignee's co-pending U.S. patent application Ser. No. 06/097,555 of R. Basson et al, filed Sept. 15, 1987, entitled "Modular Trim Panel Unit For Motor Vehicle Doors," the disclosure of which also is incorporated herein by reference.

Multiplexing systems for automotive use for controlling and/or powering various electrical components in various locations within a car or other vehicle, including the doors, have been in use for some time, and these have had some tendency to cut down on the number of wires across the hinge gap. Some such systems have also included one or more remote multiplexing or "remux" units associated with a main multiplexing unit in the vehicle body. However, these prior art approaches still have not been totally satisfactory in, for example, the number of wires that still have to be run, for example, in the doors.

DISCLOSURE OF INVENTION

The present invention is directed, inter alia, to reducing the number of wires which need to extend from the main power source of the vehicle in the body of the vehicle to the doors, particularly, the front door on the driver's side, and/or to reduce the number of wires that need to be run in the doors themselves, using remote multiplexing and wiring techniques to minimize as much as practical or desirable the total number of wires.

Thus, the present invention is directed to an automotive door multiplexing system utilizing a relatively small number of wires, even for highly powered doors, reducing, for example, the number of wires from an exemplary twenty-four to an exemplary eleven or fewer wires; even for a door which includes among its powered components, for example, powered door locks, power windows, powered side rear-view mirrors, door curb locks, lighted key door locks, door curb lights, audio speakers, seat positioning controls, etc.

The present invention achieves this desired result in one aspect of the invention by preferably including within the door a remote multiplexing or "remux" unit and providing various functional, programming assumptions or rules for its associated micro-processor controller and signal processors, exemplary ones of which rules are outlined and detailed hereinafter.

Additionally, unlike the approaches of the prior art, the present invention's use of a local power control module or "remux" and appropriate functional assumptions, as needed, allows, for example, the powering of two, separate reversible motors from only three conductors. With this local multiplexing and associated arrangements, the instantaneous polarity of every power conductor switched by the electronic system is known and controlled by the system.

Likewise, four separate reversible motors can be controlled with a five wire matrix. This three wire control of two motors and/or five wire control of four motors prevents, for example, simultaneous operation of pairs of motors in certain combinations of direction. For example, a powered mirror could be tilted in a northeast-southwest direction continuously but in a northwest-southeast direction only by stepping two motors alternatively. This sort of restriction does not detract significantly from the operation of the complete door system, particularly since the multiplex system provides design latitude in assigning priorities, delays, etc., to control commands.

Of course, as in most, if not all, designs, certain compromises are required, and the system may be altered to meet the particular needs of any particular car or vehicle design. Thus, the inclusion of a local power control module in the door may cause some space conflict with some door designs and may require some heat-sinking. In other designs, these aspects create no problems or are nonexistent.

In the invention a number of different approaches are possible. Several of them include the following.

One approach is to utilize electrical components in the door being controlled from the power control module in the main car body. In this approach, the number of wires crossing the hinge gap can be limited to, for example, thirteen, by extending the concept of controlling two motors with three wires to having all the electrical loads share a common return lead. This is contrary to traditional circuits, where the return lead always has the some polarity, normally the body ground potential. This approach of the invention utilizes a common lead which is switched back and forth from positive to negative potential by the power control module.

A further approach is to use components in the door which are controlled jointly by the main control module in the car body and a low power control unit in the door, with the low power control unit controlling relatively low power components and the main control module still controlling the relatively high power components or combined systems. This arrangement reduces the number of wires crossing the hinge gap to, for example, eleven. With a power control module in each front door, the wiring can be reduced to, for example, nine wires crossing the hinge gap, and even this can be reduced to, for example, eight if, for example, the curb and key lock lamps are controlled by the power control module in the door rather than from the car body.

The foregoing and other features and advantages of the present invention will become more apparent from the following description and drawings.

BRIEF DESCRIPTION OF DRAWINGS

FIG. 1 is a schematic view of the exemplary circuitry and multiplexing components used in an exemplary embodiment of the present invention utilizing eleven wires, including two for the audio speaker wires, across the hinge gap to control and/or power a relatively large number of components located in the vehicle's doors, particularly the front doors, including a local "remux" unit and an associated low power unit in each of the front doors; while

BEST MODE FOR CARRYING OUT THE INVENTION

Figure 1:
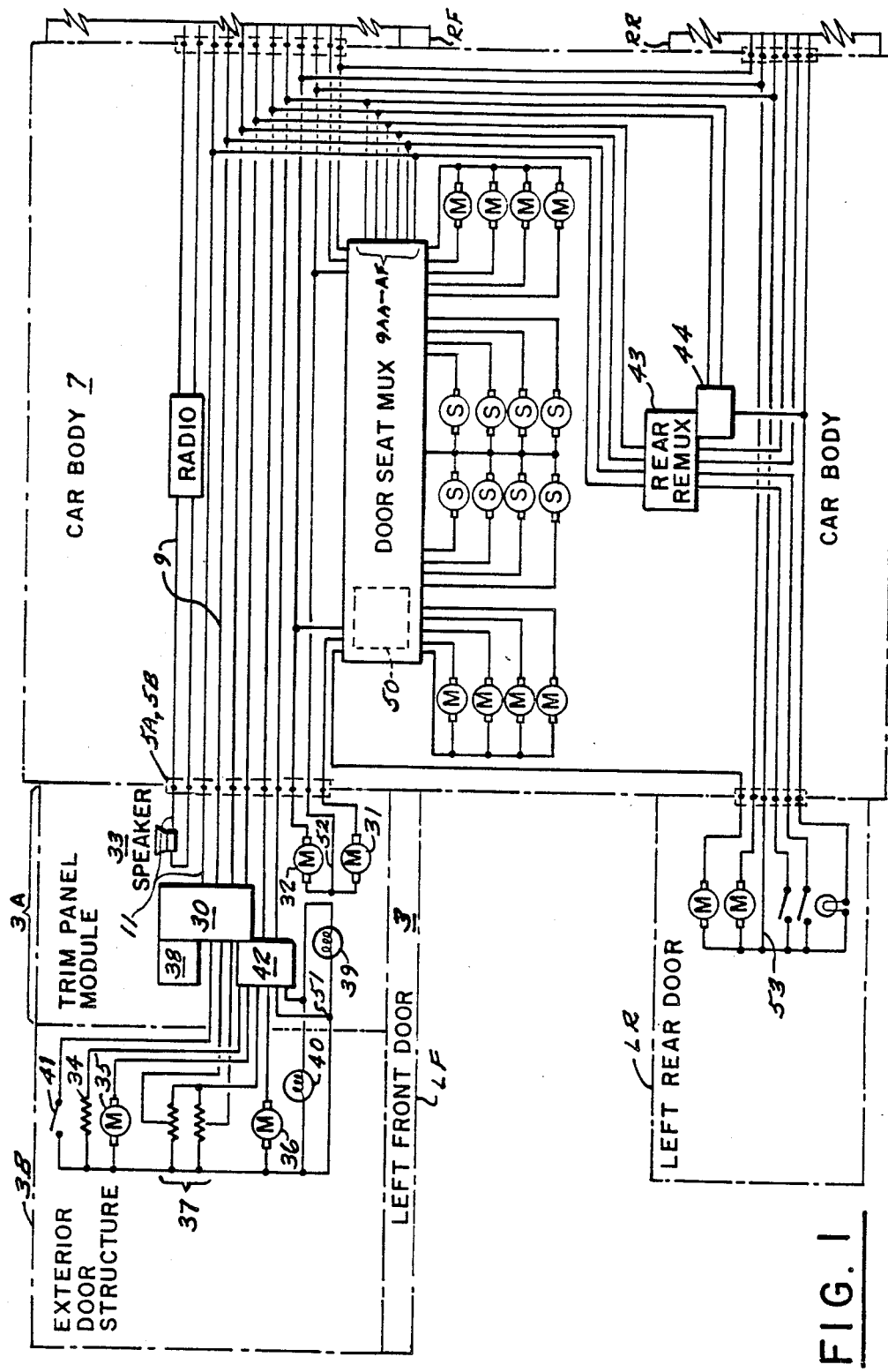

As illustrated in the schematic of FIG. 1, if a part of the multiplexing system of the vehicle's electrical system is included within the driver's door 3 in the form of a remote multiplexing module or "remux" 30, a total of, for example, only eleven wires 11, including two for the audio speaker 33, are necessary, even for a highly powered driver's door, to be extended from the driver's or left front door 3, for interconnection into the main electrical system. This interconnection is achieved by means of the individual body wires 9 in the vehicle body 7.

The door electrical components can include, for example, electrically powered windows having for the driver's window the reversible drive motor 31 and window switch array controls 38, having a series of user operated "on/off" switches, not only for the adjacent window, but also for the other windows, as well as other door components; a reversible, powered door lock actuator 32; audio speaker 33; a curb lamp 39; a key lock light 40 actuated by the exterior handle switch 41; even a powered, heated, side rear-view mirror having a heater 34, a reversible vertical movement motor 35 and a reversible horizontal movement motor 36 associated with position sensing potentiometers 37; and a low power control or switching unit 42. The low power control unit 42 acts like a bunch of switches under the control of the remux unit 30. The various reversible motors used in the system typically are DC motors with permanent magnetic fields, which motors are reversible to, for example run the powered window(s) up and down, and to lock and unlock the door(s), with the direction of movement determined by the polarity of the DC power applied to the motor.

Thus, as noted, in the exemplary schematic shown in FIG. 1, the exemplary circuit uses only nine electrical wires 11, along with two audio speaker wires, extending from the door 3 to the main vehicle body 7 across the hinge gap. This "across-the-hinge-gap" wiring can be in the form, for example, of a planar cable array, using mating end connectors 5A, 5B, at the "A" pillar, as described in some detail in the co-pending Wright application referred to above.

The number of wires 11 going across the hinge gap can be varied, depending on, for example, circuitry changes, electrical components and programming logic, as explained more fully below. Additionally exemplary components could include seat positioning controls, located for example in the switch array 38.

The wiring and components for the driver's or left front door 3 can be duplicated in the right front (RF) door and interconnected, as illustrated. The left rear (LR) and right rear (RR) doors typically include fewer components and controls. For example, they can each include, as illustrated in FIG. 1 for the left rear door, separate power motors for the associated window regulator and door lock for the door and with two separate switches to control them, as well as a curb light. The components of each rear door are connected through six wires to the rear remux unit 43 and its associated low power control unit 44, which in turn are interconnected to the switch controls in the front doors, all as illustrated.

The six internal, body wires 9AA–AF coming off of the main or door seat multiplexing unit, from top to bottom as illustrated in FIG. 1, can contain the following power and signal lines, as outlined below:

| Wire | Signal |
| --- | --- |
| 9AA | Ground |
| 9AB | 12 V+ |
| 9AC | Data |
| 9AD | Clock |
| 9AE | 5 V− |
| 9AF | 5 V+ |

The lines or wires 9AA and 9AB provide grounded battery power shared with all of the other systems which are electrically powered, while 9AE and 9AF are used only for the multiplexing controllers 30, etc., contained in the front doors (LF and RF), the main or door seat multiplexing unit, which contains a programmable micro-processor or CPU (central processing unit) 50 with associated signal processors, and the rear remote multiplexing or "remux" unit 43. However, if desired, instrument panel functions can be added to the multiplexed system. Lines 9AC and 9AD provide data and clock signals, respectively, for the multiplexing units.

Figure 1A:
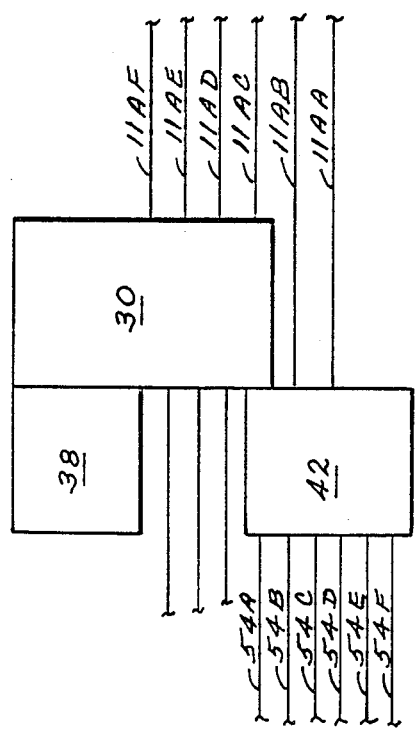
FIG. 1A is a close-up, detail view of the remux module and its associated electronic or electrical components and their associated wiring contained in the door trim panel module for the vehicle.

As can be seen in FIGS. 1 and 1A, the remux unit 30 includes a total of four lines 11AF-AC, which are connected to the lines 9AF-AC, respectively, through the mated connectors 5A/5B. These lines form the signaling portion of the multiplexing system, providing control for the system, and, as can be seen in the schematic, likewise extend to all of the multiplexing units through interconnecting wiring in the car body.

Lines 11AB and 11AA are connected to lines 9AB and 9AA, respectively, and provide battery power to the low power control unit 42. The low power unit 42, which can be included on the same circuit board as the remux unit 30, serves basically as a switching system, to power and control all of the electrical components located to its left in the schematic, namely components 34–37 and 39–41, through wires 54A–F. These components are all relatively low power components, with the mirror motors 35 and 36 drawing, for example, only a half amp. Restricting the power lines 11AB and 11AA to only relatively low power components diminishes, if not eliminates, the need for any heat sinking in the door. A door, of course, is poorly suited for dissipation of any significant, internally generated heat, having relatively little extra internal room and very limited access to the ambient.

In contrast, the relatively high power components or systems, such as the window motor 31 and the door lock actuator 32, of which there are a total of four connected together in parallel in a four door vehicle, are powered directly from the main multiplexing unit located in the vehicle body 7. Being in the interior of the vehicle, of course, which has more room and better access to the ambient, allows the main multiplexing unit to better handle heat sinking and heat dissipation.

With respect to power, for example, the window motor 31 draws about a relatively high ten amps. Likewise, while each individual door actuator draws, for example, only about three amps, when all four of them are actuated together, resulting in them being concurrently powered, the powered door lock system totally draws a relatively high current of, for example, twelve amps. Of course, the greater the amperage for a given resistance, the greater will be the heat generated—by a factor based on the amperage squared.

It should be noted that line 54E is connected across one side of all of those components through connection or junction 51. This provides a common lead to both of the reversible mirror motors 35 and 36, with the other sides of those motors being connected to lines 54B and 54D, respectively, back to the low power unit 42. Such a common lead situation also occurs with respect to the reversible motors 31 and 32 by means of common line 52 going to the main multiplexing unit; and also with respect to the reversible motors for the window and the door lock in the left rear door (LR) by means of the common line 53 going to the rear remux unit 43. With this multiplexing arrangement, the instantaneous polarity of every power conductor switched by the electronic system is known and controlled by the system using certain rules of precedents. This three wire hookup, with the common wire or lead used to switch the polarity of the DC power to the motor, is in contrast to the four separate wires used in the prior art to control such reversible motors.

Likewise, in a similar fashion, four separate reversible motors can be controlled with a five wire matrix. This three wire control of two motors and five wire control of four motors prevents simultaneous operation of pairs of motors in certain combinations of direction. For example, a powered mirror could be tilted in a northeast-southwest direction continuously but in a northwest-southeast direction only by stepping two motors alternatively. This sort of restriction does not detract significantly from the operation of the complete door system, particularly since the multiplex system provides design latitude in assigning priorities, delays, etc., to control commands.

In order to achieve this relatively low number of wires, as compared to the relatively high number of wires in the prior art, certain techniques of the invention are necessary and used, including the exemplary logic rules outlined below, which provide selected precedents of action. These logic rules are programmed into the electronic controller and signal processors 50 of the main multiplexing unit through appropriate software to provide the appropriate electrical signals to the various multiplexing units.

Exemplary Functional, Programming Rules (1) Locking doors can interrupt the lowering of any window.

(2) Locking doors can not be interrupted by the lowering of any window.

(3) Doors can lock simultaneously with the upward motion of any window.

(4) Doors can unlock simultaneously with the downward motion of any window.

(5) Unlocking doors can not be interrupted by the raising of any window.

(6) The raising of any window can not be interrupted by unlocking doors.

(7) Only one window at a time can be moved (protection for the common line power field effect transistor or "FET").

(8) The driver's door lock and unlock commands, that is commands from the left front ("LF") door 3, cancel any conflicting commands from the right front door ("RF").

(9) The driver's window commands can interrupt any window commands from RF, the left rear door ("LR"), and/or the right rear door ("RR").

(10) The driver's window commands do not block any conflicting commands from RF, LR, and/or RR.

(11) Alternatively driver's window commands may cancel any conflicting commands from RF, LR or RR.

(12) The driver's window commands can not be interrupted by window commands from RF, LR, and/or RR.

(13) Window commands from RF, LR, or RR can not be interrupted by a second window command from RF, LR, and/or RR.

(14) The driver's first window command can not be interrupted by any second window command from LF.

(15) Window motors and mirror motors 31, 35–36, etc., will have dynamic braking.

(16) Door lock actuators 32, etc., will not have dynamic braking.

(17) When any door is open, all four curb lamps 39, etc., both key lock lamps (40 and the RF light analogous thereto), and the dome lamp (not illustrated) will be illuminated with the exceptions noted below.

(18) Neither rear curb lamps will be illuminated, while any doors are being unlocked or any window is moving down.

(19) Left front curb and key lock lamps or lights 39, 40 will not be illuminated, while the left side rear-view mirror is moving down or right under the actions of the motors 35, 36, respectively.

(20) Right front curb and key lock lamps (those comparable to lights 39, 40) will not be illuminated, while the right side rear-view mirror is moving down or right under the actions of the motors analogous to the motors 35, 36, respectively.

(21) If the memory position for a mirror is above and to the right of the starting position, as sensed by the resistive units 37, memory logic will first tilt the mirror upward to the memory limit through the vertical motor 35, etc., and then tilt the mirror to the right through the horizontal motor 36, etc., until it reaches the memory position.

(22) If the memory position for a mirror is below and to the left of the starting position, as sensed by the resistive units 37, memory logic will first tilt the mirror to the left to the memory limit through the vertical motor 35, etc., and then tilt the mirror downward through the horizontal motor 36, etc., until it reaches the memory position.

The foregoing functional assumptions or programming rules merely represent one exemplary set, although a very representative and practical, preferred set, which may be made and implemented by the logical design of the electronic modules involved.

Many changes can be made to the exemplary functional assumptions without modifying the proposed wiring scheme detailed in the exemplary, preferred embodiment. Other changes in the assumptions providing more simultaneous operation of various ones of the power actuators could be implemented by adding to the number of wires involved.

Of course, as in most, if not all, designs, certain compromises are required, and the system may be altered to meet the particular needs of any particular car or vehicle design. Thus, the inclusion of a local power control module in the door may cause some space conflict with some door designs and may require some heat-sinking. In other designs, these aspects create no problems or are nonexistent.

Although this invention has been shown and described with respect to a detailed, exemplary embodiment thereof, it should be understood by those skilled in the art that various changes in form, detail, methodology and/or approach may be made without departing from the spirit and scope of this invention.

Having thus described at least one exemplary embodiment of the invention, that which is new and desired to be secured by Letters Patent is claimed below:

1. A vehicle having a main body, a main DC power source contained in the body, at least one door movably attached to the body of the vehicle to open and close with an attachment gap between them, a number of electrical components in the door with the electrical components powered by the main DC power source, comprising:

at least one relatively low power DC electrical component and at least one relatively high power DC electrical component in the door;

a main multiplexing unit located in the main vehicle body;

a remote multiplexing unit electrically connected to said main multiplexing unit but located in the door, the two multiplexing units being electrically connected together by wiring extending across the hinge gap; and a low power control unit also located in the door associated with and controlled by said remote multiplexing unit, the DC power from the main DC power source to the low power unit being directly supplied through said low power control unit in the door through wiring totally contained in the door, while the DC power from the main power source to the high power unit is directly supplied from said main multiplexing unit in the vehicle body through the wiring extending across the attachment gap.

2. The vehicle of claim 1, wherein said low power component draws a maximum of about three amps, while the high power component draws a minimum of about nine amps.

* * * * *